(12) United States Patent
Martch (10) Patent No.: US 8,763,027 B2
(45) Date of Patent: *Jun. 24, 2014

(54) RECORDING ADDITIONAL CHANNELS OF A SHARED MULTI-CHANNEL TRANSMITTER

(75) Inventor: Henry Gregg Martch, Parker, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 13/286,157

(22) Filed: Oct. 31, 2011

(65) Prior Publication Data
US 2013/0055314 A1  Feb. 28, 2013

Related U.S. Application Data

(60) Provisional application No. 61/526,382, filed on Aug. 23, 2011.

(51) Int. Cl.
| | | |
|---|---|---|
| H04N 7/167 | (2011.01) | |
| H04N 5/445 | (2011.01) | |
| G06F 3/00 | (2006.01) | |
| G06F 13/00 | (2006.01) | |
| H04N 7/173 | (2011.01) | |

(52) U.S. Cl.
USPC ............. 725/31; 725/38; 725/58; 725/131; 725/134

(58) Field of Classification Search
None
See application file for complete search history.

(56) References Cited

U.S. PATENT DOCUMENTS

| | | |
|---|---|---|
| 4,706,121 A | 11/1987 | Young |
| 5,187,589 A | 2/1993 | Kono et al. |
| 5,335,277 A | 8/1994 | Harvey et al. |
| 5,541,738 A | 7/1996 | Mankovitz |
| 5,642,153 A | 6/1997 | Chaney et al. |
| 5,684,969 A | 11/1997 | Ishida |
| 5,805,763 A | 9/1998 | Lawler et al. |

(Continued)

FOREIGN PATENT DOCUMENTS

WO   2011/027236 A1   3/2011

OTHER PUBLICATIONS

Author Unknown, "Move Networks is Delivering the Next Generation of Television," Move Networks, 2010, obtained online at http://www.movenetworks.com/, 2 pages.

(Continued)

*Primary Examiner* — Mark D Featherstone
*Assistant Examiner* — Akshay Doshi
(74) *Attorney, Agent, or Firm* — Kilpatrick Townsend & Stockton LLP (57) ABSTRACT

A method for recording multiple pieces of content with a single tuner. A content delivery network can include multiple channels organized into bands with several channels per band. These bands can be transmitted on an up-link such as to a satellite. The bands can be relayed to receivers at the end user locations. The end user receivers can tune to one, two, or some other fraction of the total number of transmitted bands. When a user selects a program to view and/or record, a tuner of the receiver tunes to the band that includes the channel that includes the program. The method prompts the user regarding the other channels that form the set of channels on that band, and solicits input for recording one or more concurrent programs of the band, which can all be recorded on the single receiving tuner.

17 Claims, 6 Drawing Sheets

(56) References Cited

U.S. PATENT DOCUMENTS

| | | | |
|---|---|---|---|
| 6,628,891 B1* | 9/2003 | Vantalon et al. | 386/255 |
| 6,701,528 B1 | 3/2004 | Arsenault et al. | |
| 6,766,523 B2 | 7/2004 | Herley | |
| 7,024,676 B1 | 4/2006 | Klopfenstein | |
| 7,487,529 B1 | 2/2009 | Orlick | |
| 7,490,169 B1 | 2/2009 | Ogdon et al. | |
| 7,493,312 B2 | 2/2009 | Liu et al. | |
| 7,542,656 B2 | 6/2009 | Cho et al. | |
| 7,577,751 B2 | 8/2009 | Vinson et al. | |
| 7,590,993 B1 | 9/2009 | Hendricks et al. | |
| 7,739,711 B2 | 6/2010 | Finseth et al. | |
| 7,804,861 B2 | 9/2010 | Kim | |
| 7,926,078 B2 | 4/2011 | Arsenault et al. | |
| 7,962,937 B2 | 6/2011 | Cho et al. | |
| 8,437,622 B2 | 5/2013 | Casagrande | |
| 8,447,170 B2 | 5/2013 | Casagrande | |
| 2001/0033736 A1 | 10/2001 | Yap et al. | |
| 2001/0034787 A1 | 10/2001 | Takao et al. | |
| 2002/0055343 A1 | 5/2002 | Stetzler et al. | |
| 2002/0097340 A1 | 7/2002 | Takagi et al. | |
| 2002/0152299 A1 | 10/2002 | Traversat et al. | |
| 2002/0188943 A1 | 12/2002 | Freeman et al. | |
| 2003/0110514 A1 | 6/2003 | West et al. | |
| 2003/0177495 A1 | 9/2003 | Needham et al. | |
| 2003/0200548 A1 | 10/2003 | Baran et al. | |
| 2003/0208763 A1 | 11/2003 | McElhatten et al. | |
| 2004/0015992 A1 | 1/2004 | Hasegawa et al. | |
| 2004/0015999 A1 | 1/2004 | Carlucci et al. | |
| 2004/0162871 A1 | 8/2004 | Pabla et al. | |
| 2004/0242150 A1 | 12/2004 | Wright et al. | |
| 2005/0120049 A1 | 6/2005 | Kanegae et al. | |
| 2005/0125683 A1* | 6/2005 | Matsuyama et al. | 713/189 |
| 2005/0229213 A1 | 10/2005 | Ellis et al. | |
| 2005/0271365 A1 | 12/2005 | Hisatomi | |
| 2006/0206819 A1 | 9/2006 | Tsuji et al. | |
| 2006/0215993 A1 | 9/2006 | Yamada | |
| 2007/0039032 A1 | 2/2007 | Goldey et al. | |
| 2007/0157253 A1 | 7/2007 | Ellis et al. | |
| 2007/0165855 A1 | 7/2007 | Inui | |
| 2007/0204288 A1 | 8/2007 | Candelore | |
| 2008/0046929 A1 | 2/2008 | Cho et al. | |
| 2008/0092164 A1 | 4/2008 | Agarwal et al. | |
| 2008/0141322 A1 | 6/2008 | Jang et al. | |
| 2008/0152039 A1 | 6/2008 | Shah et al. | |
| 2008/0184327 A1 | 7/2008 | Ellis et al. | |
| 2008/0216119 A1* | 9/2008 | Pfeffer et al. | 725/40 |
| 2008/0216136 A1* | 9/2008 | Pfeffer et al. | 725/100 |
| 2008/0271077 A1 | 10/2008 | Kim et al. | |
| 2008/0276284 A1 | 11/2008 | Bumgardner et al. | |
| 2008/0288461 A1 | 11/2008 | Glennon et al. | |
| 2008/0291206 A1 | 11/2008 | Uchimura et al. | |
| 2009/0100466 A1 | 4/2009 | Migos | |
| 2009/0165057 A1 | 6/2009 | Miller et al. | |
| 2009/0178098 A1 | 7/2009 | Westbrook et al. | |
| 2009/0260038 A1 | 10/2009 | Acton et al. | |
| 2010/0020794 A1* | 1/2010 | Cholas et al. | 370/389 |
| 2010/0050225 A1 | 2/2010 | Bennett | |
| 2010/0158479 A1* | 6/2010 | Craner | 386/92 |
| 2010/0158480 A1 | 6/2010 | Jung et al. | |
| 2010/0169926 A1 | 7/2010 | Westberg et al. | |
| 2010/0265391 A1 | 10/2010 | Muramatsu et al. | |
| 2010/0284537 A1* | 11/2010 | Inbar | 380/277 |
| 2010/0313222 A1 | 12/2010 | Lee et al. | |
| 2011/0043652 A1 | 2/2011 | King et al. | |
| 2011/0078750 A1 | 3/2011 | Tam et al. | |
| 2012/0278837 A1 | 11/2012 | Curtis et al. | |
| 2012/0296745 A1 | 11/2012 | Harper et al. | |
| 2012/0311634 A1* | 12/2012 | VanDuyn | 725/41 |
| 2013/0051555 A1 | 2/2013 | Martch et al. | |
| 2013/0051758 A1 | 2/2013 | Kummer et al. | |
| 2013/0051764 A1 | 2/2013 | Casagrande | |
| 2013/0051766 A1 | 2/2013 | Martch et al. | |
| 2013/0051773 A1 | 2/2013 | Casagrande | |
| 2013/0054579 A1 | 2/2013 | Kennedy | |
| 2013/0055304 A1 | 2/2013 | Kirby et al. | |
| 2013/0055305 A1 | 2/2013 | Martch et al. | |
| 2013/0055310 A1 | 2/2013 | VanDuyn et al. | |
| 2013/0055311 A1 | 2/2013 | Kirby et al. | |
| 2013/0055333 A1 | 2/2013 | Kummer | |
| 2013/0216208 A1 | 8/2013 | Kummer et al. | |
| 2013/0223814 A1 | 8/2013 | Casagrande | |
| 2013/0243401 A1 | 9/2013 | Casagrande | |

OTHER PUBLICATIONS

International Search Report and Written Opinion of PCT/US2012/052011 mailed Dec. 17, 2012, 44 pages.

Jung, J., et al., "Design and Implementation of a Multi-Stream CableCARD with a High-Speed DVB-Common Descrambler," ACM Multimedia, 2006, 4 pages.

U.S. Appl. No. 13/215,702, filed Aug. 23, 2011, Notice of Allowance mailed Feb. 11, 2013, 13 pages.

U.S. Appl. No. 13/324,831, filed Dec. 13, 2011 Non-Final Office Action mailed Feb. 28, 2013, 23 pages.

U.S. Appl. No. 13/292,047, filed Nov. 8, 2011 Non-Final Office Action mailed Jan. 18, 2013, 17 pages.

U.S. Appl. No. 13/614,899, filed Sep. 13, 2012 Non-Final Office Action mailed Feb. 5, 2013, 17 pages.

U.S. Appl. No. 13/291,014, filed Nov. 7, 2011 Non-Final Office Action mailed Mar. 29, 2013, 21 pages.

U.S. Appl. No. 13/302,852, filed Nov. 22, 2011, Non-Final Rejection mailed May 23, 2013, 19 pages.

International Search Report and Written Opinion of PCT/US2012/51992 mailed Nov. 2, 2012, 15 pages.

International Search Report and Written Opinion of PCT/US2012/51987 mailed Oct. 23, 2012, 20 pages.

International Search Report and Written Opinion of PCT/US2012/051984 mailed Nov. 5, 2012, 13 pages.

International Search Report and Written Opinion of PCT/US2012/52002 mailed Oct. 16, 2012, 17 pages.

International Search Report and Written Opinion of PCT/US2012/51964 mailed Nov. 2, 2012, 13 pages.

U.S. Appl. No. 13/149,852, filed May 31, 2011, Non-Final Office Action mailed Dec. 12, 2012, 9 pages.

U.S. Appl. No. 13/215,916, filed Aug. 23, 2011 Notice of Allowance mailed Jan. 4, 2013.

U.S. Appl. No. 13/294,005, filed Nov. 11, 2011 Final Office Action mailed Jan. 3, 2014, 29 pages.

U.S. Appl. No. 13/215,655, filed Aug. 23, 2011 Final Office Action mailed Dec. 18, 2013, 20 pages.

U.S. Appl. No. 13/302,852, filed Nov. 22, 2011, Final Rejection mailed Dec. 9, 2013, 23 pages.

U.S. Appl. No. 13/215,598, filed Aug. 23, 2011 Final Office Action mailed Nov. 21, 2013, 23 pages.

U.S. Appl. No. 13/149,852, filed May 31, 2011, Notice of Allowance mailed Jul. 11, 2013, 13 pages.

U.S. Appl. No. 13/149,852, filed May 31, 2011, Final Office Action mailed Mar. 26, 2013, 13 pages.

U.S. Appl. No. 13/288,002, filed Nov. 2, 2011, Non-final Office Action mailed Sep. 26, 2013, 15 pages.

U.S. Appl. No. 13/324,831, filed Dec. 13, 2011 Notice of Allowance mailed Sep. 4, 2013, 22 pages.

U.S. Appl. No. 13/292,047, filed Nov. 8, 2011 Final Office Action mailed Aug. 19, 2013, 17 pages.

U.S. Appl. No. 13/614,899, filed Sep. 13, 2012 Non-Final Office Action mailed Sep. 17, 2013, 17 pages.

U.S. Appl. No. 13/291,014, filed Nov. 7, 2011 Notice of Allowance mailed Aug. 7, 2013, 16 pages.

U.S. Appl. No. 13/215,598, filed Aug. 23, 2011 Non-Final Office Action mailed Jun. 20, 2013, 15 pages.

U.S. Appl. No. 13/215,655, filed Aug. 23, 2011 Non-Final Office Action mailed Sep. 6, 2013, 27 pages.

U.S. Appl. No. 13/294,005, filed Nov. 11, 2011 Non-Final Office Action mailed Aug. 14, 2013, 32 pages.

U.S. Appl. No. 13/592,976, filed Aug. 23, 2012 Notice of Allowance mailed Oct. 7, 2013, 18 pages.

* cited by examiner

| 6:00 pm | 6:30 pm | 7:00 pm | 7:30 pm | 8:00 pm | 8:30 pm | 9:00 pm | 9:30 pm |
|---|---|---|---|---|---|---|---|
| | | Show A | | Show F | | | |
| | | Show B | | Show H | Show G | | |
| | | Show X | | Show I | Show K | | |
| | | Show C | | Show J | Show L | | |

Band 2

RECORDING ADDITIONAL CHANNELS OF A SHARED MULTI-CHANNEL TRANSMITTER

CROSS REFERENCE TO RELATED APPLICATION

The present application claims the benefit under 35 U.S.C. §119(e) to U.S. Provisional Patent Application No. 61/526,382, which was filed on Aug. 23, 2011, and entitled "Recording Additional Channels of a Shared Multi-Channel Transmitter," which is incorporated by reference into the present application in its entirety.

FIELD OF THE INVENTION

This disclosure relates generally to content recording, and more specifically to recording multiple channel streams on a multi-channel transmitter.

BACKGROUND

Conventional content transmission networks can be configured to provide a data stream from a source transmitter (e.g., cable hub, satellite, etc.) to a receiver (e.g., cable receiver, satellite dish, etc.). A conventional transmitter can be configured to handle a certain amount of bandwidth (e.g., 40 megabits per second), which may be determined (e.g., limited) by the physical technology used to facilitate the transmissions. Traditional content streams may consume a smaller amount of data, e.g., a single high definition digitally encoded channel may consume an average of 4 megabits per second. Thus, a conventional content provider can transmit a plurality of channels on a single transmitter, e.g., a 40 megabit transmitter can transmit approximately ten 4 megabit channels. Conventional video encoding sizes can depend on the video content, not only the resolution and format of the underlying video, and therefore, fluctuate in the amount of bandwidth each channel consumes at any given moment. Conventional averaging, load-balancing, and/or statistical analysis can be used to configure the channel loads of each transmission stream and determine the exact number of channels on a transmission stream. Regardless of the exact number, each conventional transmission stream can be configured to carry a plurality of channels.

For a particular transmission stream, a plurality of channels can be encoded with a codeword or some other encryption method, multiplexed together and transmitted to a receiving arrangement. The receiving arrangement can include a tuner that selects which of the plurality of channels a user is "tuned" to and decode that particular channel to present on a video output device (e.g., television) and/or record to a storage device (e.g., digital video recorder). The receiving arrangement can conventionally receive one (or some small number of) transmission streams, and can conventionally decode one (or some small number of) channels within the one transmission stream. In one example, a conventional operation can include transmitting eighty channels on ten streams, with eight channels per stream. When a user tunes to or records a particular channel, the receiver arrangement (e.g., a user's satellite dish and receiver box) can tune to the particular data stream having that channel and then decode the particular channel. When a user changes channels within the same transmission stream, the receiving arrangement can immediately begin decoding the new channel. When a user changes channels to a channel on a different transmission stream, the receiving arrangement can tune to the new data stream, and begin decoding the particular channel. Conventional arrangements typically provide one tuner or two tuners, sometimes four tuners, but could provide any other number. Typically however, the number of channels that can be recorded and/or viewed at any one time is a very small subset of all available channels, and each tuner can typically decode only one channel at a time, limiting the number of recordable channels to the number of independent tuners included in the conventional receiving arrangement.

SUMMARY

One or more exemplary embodiments can include systems and methods of the present disclosure for recording additional channels without requiring additional tuner hardware. For example, one exemplary method of the present disclosure can include receiving from a user a request to record a particular piece of content from a content delivery network. The content delivery network is configured such that it delivers a plurality of pieces of content organized into a plurality of content subsets on a plurality of channels that are organized into a plurality of channel subsets on a plurality of bands. The exemplary method can include identifying a particular channel associated with the particular piece of content, identifying a particular band associated with the particular channel, and informing the user of other channels associated with the particular band. The exemplary method can include receiving from the user a request to record another particular piece of content associated with one of the other channels associated with the particular band. Further, the exemplary method can include concurrently recording the particular piece of content and the other particular piece of content with a single tuner.

In alternative or additional exemplary embodiments of the present disclosure, the particular piece of content and the other particular piece of content are delivered concurrently in a pre-scheduled temporally linear manner. Alternatively or additionally, informing the user of other channels can include informing the user of a plurality of particular pieces of content scheduled to be delivered on the other channels associated with the particular band concurrently with the particular piece of content on the particular channel. Alternatively or additionally, the particular piece of content is a streaming audio-video transmission.

In another exemplary embodiment of the present disclosure, an exemplary system for displaying and/or recording multiple content streams on a single tuner is provided and includes a transponder-receiver configured to select and receive a band of channels from a plurality of bands over a channel distribution network. The exemplary system includes an electronic processor in communication with the transponder-receiver and in communication with an electronic storage medium. The exemplary electronic processor is configured to receive user-input for displaying and/or recording a particular piece of content; identify a particular channel associated with the particular piece of content; and identify a particular band associated with the particular channel. The exemplary electronic processor can also be configured to provide the user information of other channels associated with the particular band; and receive from the user a request to display and/or record another particular piece of content associated with one of the other channels associated with the particular band. The exemplary electronic processor can be configured to, responsive to occurrence of a pre-scheduled content start time, tune the tuner to the particular band; and then concurrently record the particular piece of content and the other particular piece of content with a single tuner.

In alternative or additional exemplary embodiments of the present disclosure, the particular piece of content and the other particular piece of content are delivered concurrently in a pre-scheduled temporally linear manner. Alternatively or additionally, being configured to inform the user of other channels includes informing the user of a plurality of particular pieces of content scheduled to be delivered on the other channels associated with the particular band concurrently with the particular piece of content on the particular channel. Alternatively or additionally, the particular piece of content is a streaming audio-video transmission. Alternatively or additionally, configured to concurrently record includes storing the particular piece of content and the other particular piece of content to the electronic storage medium as a single encoded file. Alternatively or additionally, configured to concurrently record includes storing the particular piece of content and the other particular piece of content to the electronic storage medium as separate decoded files. Alternatively or additionally, each piece of content is encoded with a control word, and configured to concurrently record if facilitated by the particular piece of content and the other particular piece of content being encoded with the same control word.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

In various implementations, systems and methods of the present disclosure can allow a user to record more than one channel per tuner, and up to every channel in a single multi-channel data stream per transponder. Users of content receivers may desire to access different instances of content that are broadcast simultaneously and/or substantially contemporaneously by content providers (e.g., multiple channels of a single transponder stream). For example, many television programming viewers wish to watch different television programs that occupy the same broadcast time slot. Content receivers may attempt to address this issue by utilizing multiple tuners that can each separately present and/or record different, simultaneously broadcast instances of content. However, a separate tuner is still generally required for each simultaneous or substantially contemporaneous instance of broadcast, e.g., each channel. These separate tuners may create a substantial cost for increasing the number of simultaneous channels a receiver can view and/or record. Further, in addition to separate tuners required for each instance or channel of content, the content receiver may require sufficient resources to descramble and store each of the instances of content desired by the user, which also may create a substantial cost for increasing the number or power of various electronic processors used in the descrambling logic.

Figure 1:
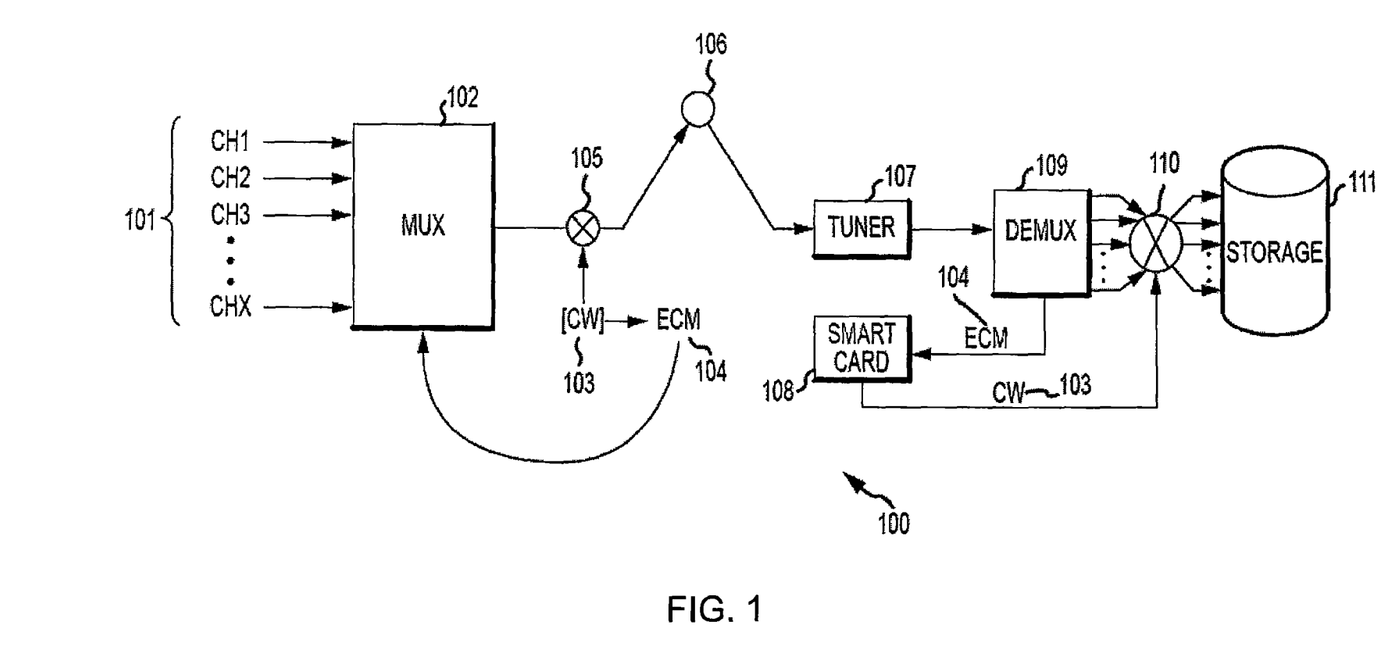
FIG. 1 is a schematic diagram of a system according to some embodiments.

FIG. 1 is a block diagram illustrating a system 100 for receiving and automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel utilizing one or more tuners. The content receiver may process only a subset of the programming channels by keeping the data associated with the particular programming channel and discarding data received via the tuned frequency band and multiplexed signal associated with other programming channels. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers (e.g., a channel broadcast provider) may select multiple instances of content 101 to be simultaneously transmitted, and may be automatically recorded by utilizing predefined recording parameters. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive the frequency band (uplink frequency band) and then broadcast the multiplexed signal to a number of content receivers on a translated frequency band (downlink frequency band), such as a content receiver that includes a tuner 107.

In conventional systems the tuner 107 may be set to a particular station, and the content receiver may align the receiving transponder to receive the particular multi-channel band that includes the particular channel. The tuner 107 may then decode the particular channel, filtering out any other channel on the band. In exemplary embodiments of the present disclosure, the receiver can facilitate a user selecting more than one channel for recording and/or viewing, if those channels are within the same band (or bands, e.g., in the case of multiple tuners).

In one exemplary embodiment illustrated in FIG. 1, channels 101 can be configured to all share a common CW and ECM. The tuner 107 may tune to the frequency band that includes the multiple instances of content (which may be performed in response to one or more recording instructions received by the content receiver that includes the tuner from the content provider). The data received via the tuned frequency may be demultiplexed by a demultiplexer 109 and then descrambled by a descrambler 110 utilizing the CW before being displayed or stored in a non-transitory storage medium 111 (which may take the form of, but is not limited to, a magnetic storage medium; optical storage medium; magneto-optical storage medium; read only memory; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file.

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the control word prior to multiplexing. In another example, in some implementations, the data received via the tuned frequency may be demultiplexed before being individually descrambled utilizing the control word.

Figure 2:
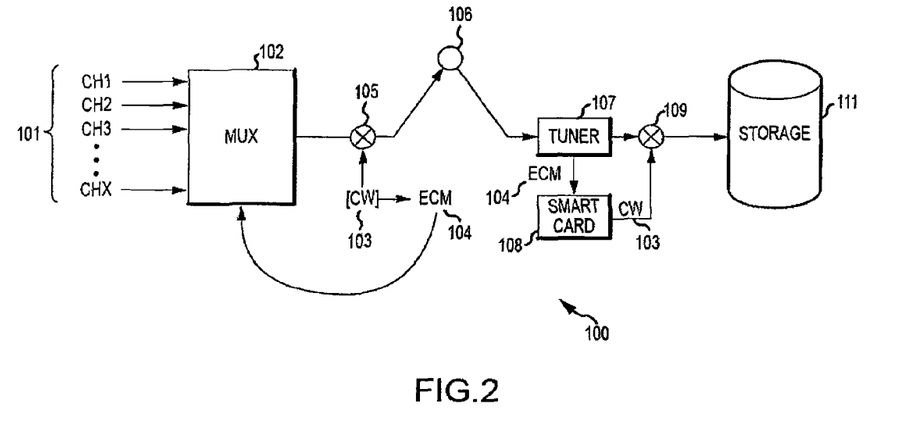
FIG. 2 is a schematic diagram of a system according to another embodiment.

In still other embodiments, as shown in FIG. 2, a system 112 may be provided where the demultiplexing operation and thus the demultiplexer 110 may be omitted. That is, as described above, the ECM may be provided to a smartcard 108 which may decrypt the ECM to obtain the CW 103 and the data received via the tuned frequency may be descrambled by a combiner 109 utilizing the CW 103. However, the multiplexed data may then be stored in a computer readable storage medium 111 in its multiplexed form. That is, the content stream may remain multiplexed and the multiple instances of content may be stored in multiplexed form rather than separating out the several instances of content and storing related instances of content in groups of associated content.

Figure 3:
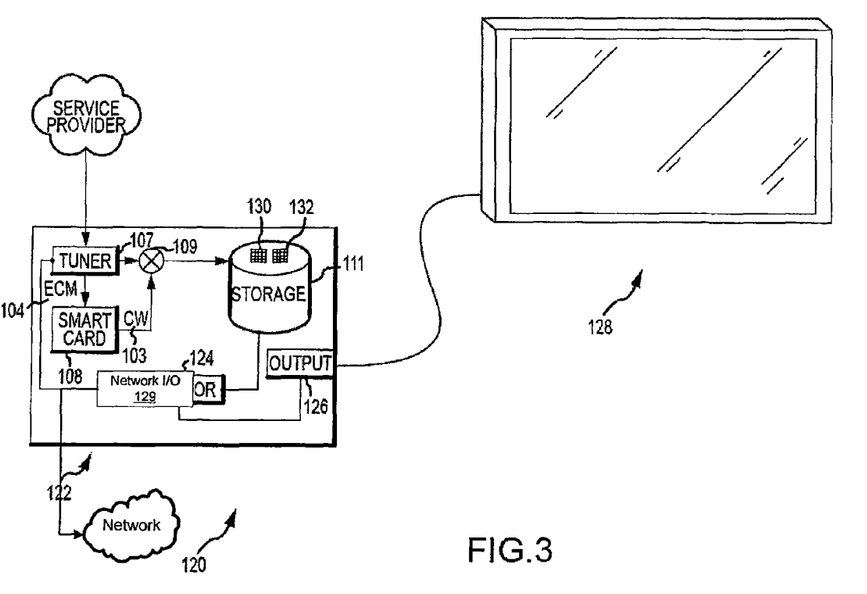
FIG. 3 depicts a system including portions of the system of FIG. 2 and several additional devices.

As shown in FIG. 3, a system 120 can be provided, according to another exemplary embodiment of the present invention, and can include devices having parts or portions of the system 112 included therein. For example, as shown, the system 120 can include a content receiver 122 having a tuner 107, a combiner 109, a smartcard 108, and a computer readable storage medium 111. The content receiver 122 may also include a computer processor 124 in communication with the tuner 107 and the storage medium 111 for controlling the tuner 107 and accessing information from or sending information to the storage medium 111. An output 126 may also be provided in communication with the processor 124 for receiving content from the processor and transmitting the content to the presentation device 128.

Exemplary embodiments can include storage of content relating to television programming on multiple different channels during the same time period (for example, four channels). The information stored may not be demultiplexed into separate files associated with the particular channels or into separate files associated with the particular programs on those channels. Rather, in this exemplary embodiment, a single block of information can be stored and may include data relating to all of the channels arranged in multiplexed form as received from the combiner.

Figure 4:
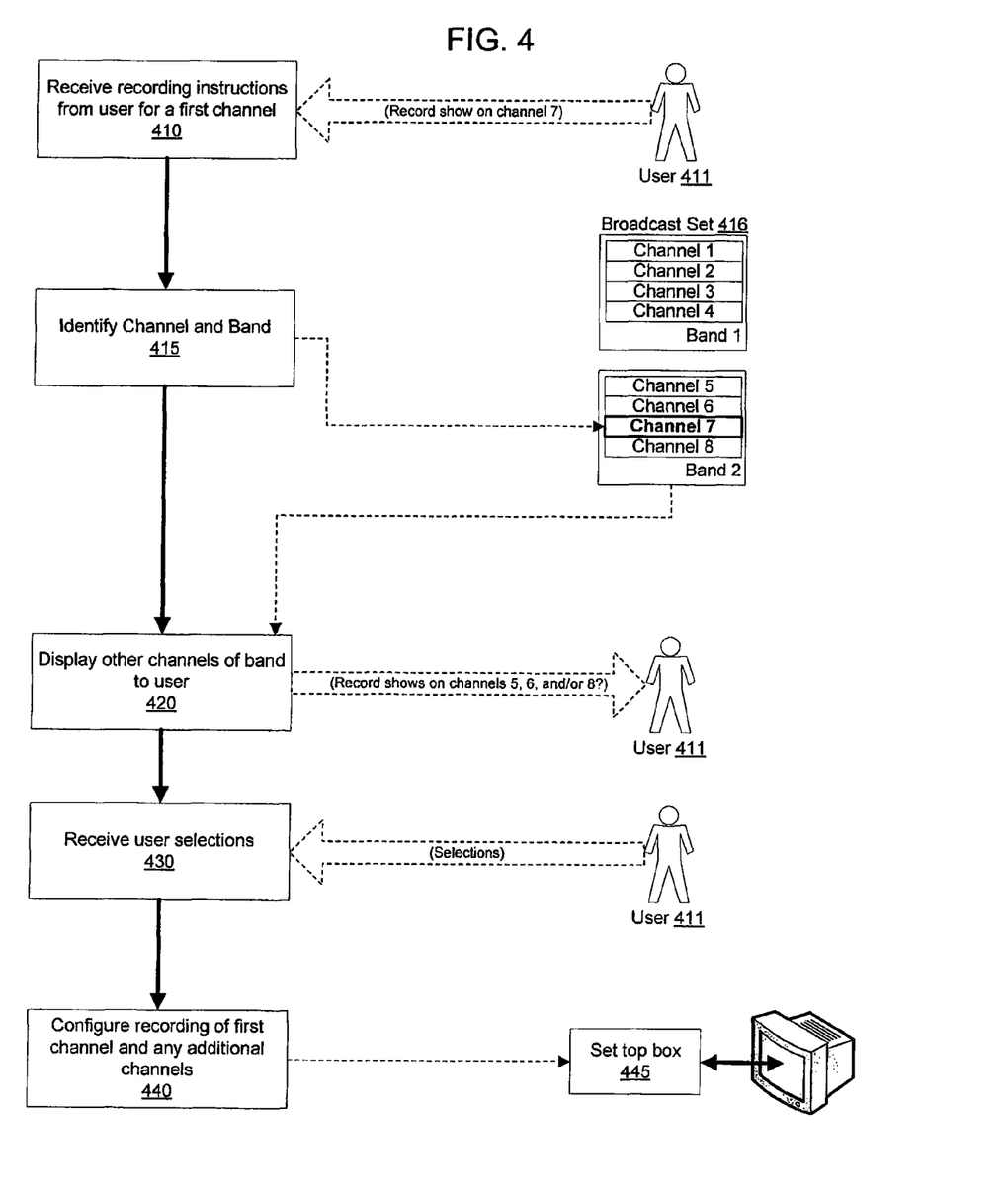
FIG. 4 is a flow chart depicting a method of providing selections for multiple recordings.

Exemplary embodiments of the present disclosure can include a user interface for user selections and user input. FIG. 4 illustrates one exemplary flow logic (e.g., an exemplary method), according to one exemplary embodiment of the present disclosure, e.g., as implemented by an exemplary user interface. At 410, the exemplary method can receive record instructions from a user (e.g., user 411), e.g., indicating the user 411 wants to record a segment of time (e.g., a show, program, etc.) of a particular channel (e.g., channel 7). The exemplary method can next, at 415, identify which band the selected channel is transmitted on. Two bands with four channels each are illustrated in FIG. 4, but any number of channels, bands, or channels per band are possible, along with different quantity of channels per band. Having identified that channel 7 is transmitted in band 2, the exemplary method, e.g., at 420, can display the other channels of this band to the user, e.g., indicating to the user that channels 5, 6, and/or 8 are also available for display or recording. At 430, user 411 can make preference selections indicating which, if any, of the other channels in the given band should be recorded, and at 440 the exemplary method can configure the user's set top box to record and/or display the selected channels, e.g., in a manner illustrated with regard to the exemplary embodiments of FIGS. 1 and 2, or any number of other suitable configurations.

It should be appreciated that multi-channel recording from within a particular band may be temporally limited to those times in which a user desires to record content on multiple channels. That is, multi-channel recording, as described herein, may be initiated only when the user wishes to record content from both a first and second channel within a band at the same time.

In the exemplary context of video content programming (e.g., television broadcasting/distribution), a user's preferences may be program (e.g., specific show) based, and less channel based. Users can have a preference for recording an entire channel (e.g., the weather channel, HGTV, or any other), but users may also have specific content preferences, regardless of which channel that content is programmed on. Thus, and in the context of the exemplary method of FIG. 4, when a user 411 provides instructions to record a show on channel 7, that show can have a start time and an end time. Then, at 420, instead of or in addition to displaying the various channels on the same band as channel 7, the exemplary method can display the specific programs that align with the user's selected show. For example, a user can specify a desire to record show X, which runs from 7:00 pm to 8:00 pm on channel 7. Then, instead of or in addition to informing the user that channels 5, 6, and 8 can also be recorded, the exemplary method can inform the user that shows A, B, and C can also be recorded, e.g., where shows A, B, and C are respectively on channels 5, 6, and 8 from 7:00 p.m. to 8:00 p.m.

In some exemplary situations, programming content on the multiple channels may not align at the same time increment.

Figure 5:
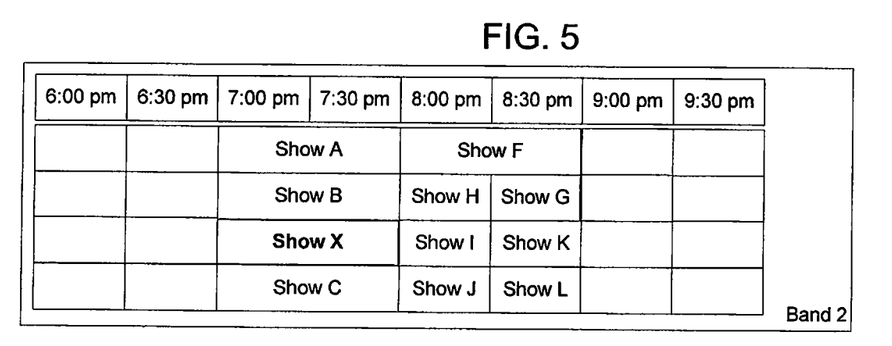
FIG. 5 is an illustration of multiple channel time-slot programming.

For example, as illustrated in FIG. 5, show F may run from 8:00 p.m. to 9:00 p.m. In this exemplary embodiment, if a user indicated a desire to record show G, which runs from 8:30 to 9:00, a single tuner would be able to record the second half of show G without needing any additional transmission recourses, but recording the first half of show G may limit the exemplary tuner to this band (e.g., Band 2) during the period of 8:00 to 8:30, when the tuner would have otherwise been free to be scheduled on other bands. Different exemplary embodiments can include one or more rules for resolving mismatches. For example, when offering other shows, based on the desire to record a first show, if a tuner resource is free during any period of no overlap, those shows can be listed, e.g., recording show G would prompt the user about also recording shows K, L, and/or F. Then, if the user indicates a desire to record show F, a second supplemental prompting can indicate to the user that shows H, I, and J are also available for recording in this block.

Exemplary embodiments can also include conditional recording options. For example, if a user chooses to record show G, the user may be presented with potential-conflict free choices K and L. Additionally, the user can be shown potentially conflicting choice F, in a way similar to K and L, or in a different manner (e.g., indicating the potential conflict during the non-overlapping time portion of show F). The user can now be presented a "record" option, and also a "record if no conflict" option. This way, the user can set this show to record if a tuner is free, but can have this show automatically deleted from the record schedule if a subsequent conflict is created (e.g., a record setting during the non-overlap time on another band). The conditional record may not actually be deleted, but may take a lower priority to any future conflicts; allowing the conditional recording to be reinstated if the conflicting recording is later deleted. With or without a conditional recording feature, exemplary embodiments may otherwise resolve conflicts. For example, if a record option is selected that creates a conflict, e.g., overlapping time on a different band, the exemplary embodiment can prompt the user of options, which may include "cancel current recording request," or "undo previously set recording option A." Further, since exemplary embodiments can allow multiple recordings on the same band, each recording can be required to be listed in the conflict resolution options. For example, a user can schedule recording of all seven shows F to L on band 2. Then, if a user tries to schedule a show on band 1, from 8:00 to 8:30, the user can be prompted to cancel this request or delete all of shows F, H, I, and J. The conflict resolution choices can be limited in exemplary embodiments with limited numbers of tuners, but can also be complicated and the number of tuners increases, as each choice can free up tuner resources in non-overlapping time blocks. Various algorithms and/or rules can be implemented for presenting conflict resolution choices to a user and/or automatically performing conflict resolution, while keeping the process user friendly and streamlined.

In another exemplary embodiment, channel organization among the several bands can be based in part on customer usage. For example, user statistics can indicate which channels are recorded most often by users, and which secondary channels are recorded most often by users who record a first channel. A content delivery provider can then organize those channels into bands to maximize customers' recording options. For example, it may be determined that four major networks are the four most often recorded channels during certain periods. The content delivery provider can then ensure that those four channels are transmitted in the same band, so that only one transponder and one tuner are required to record those channels, along with the fifth, sixth and Nth most recorded channels (where a certain band can handle "N" channels of data). Further, when organizing other, less recorded channels, bands can include channels with strong correlations. For example, "the boxing" channel may have a fraction of the viewers as the most recorded channel, but statistics may indicate that users who record "the boxing" channel have a high likelihood of recording shows on "the mixed martial arts" channel. These channels may also be grouped into a single band for the satisfaction of those overlapping viewer bases. Any other groupings, algorithms, organizations, statistics, and/or configurations are also possible with exemplary embodiments of the present invention.

Exemplary embodiments of the present disclosure can collect usage statistics via a pre-existing uplink channel, or by a separate and/or new uplink channel. Satellite, cable, and/or wireless distribution of content may include a feedback channel within the distributing technology, which can be used to upload the usage statistics and configuration commands from end-users. However, some configurations, e.g., broadcast television, does not necessarily include a feedback path. In these instances, a separate and/or new connection (e.g., a local Internet connection) may be implemented as a feedback communication path. Other private network or virtual private networks can be implemented independent of Internet Service Providers for return communication. Network I/O 129 of FIG. 3 illustrates one exemplary network connection at the set top box level, according to one exemplary embodiment of the present disclosure.

Exemplary embodiments are not limited to simultaneous recording, and exemplary embodiments can include applications of simultaneous displaying. Content providers can organize multi-channel bands around these simultaneous display applications, such as sporting events. A user can have a main display (e.g., a large display) of an athletic event of primary interest (e.g., a college football game of a particular team), and include 1 or more secondary displays with other concurrently occurring games, which can be shown on smaller displays (e.g., overlaid on the main display, or forming a full or partial block boarder along the main display, etc.). A user can set preferences for the display style, and default can be provided (e.g., 4 equally sized displays, 1 large display with three smaller displays along the left/right/top/bottom side, and/or any number of other multiple display size/location layouts). In this way a broadcaster can provide multiple channels, e.g., sports channel A to sports channel H, and legacy tuners can allow views to tune to a desired channel, while exemplary embodiments can allow users to simultaneously present all, or some subset of all these channels. Other types of content can be provided on a single band for simultaneous presentation.

Figure 6:
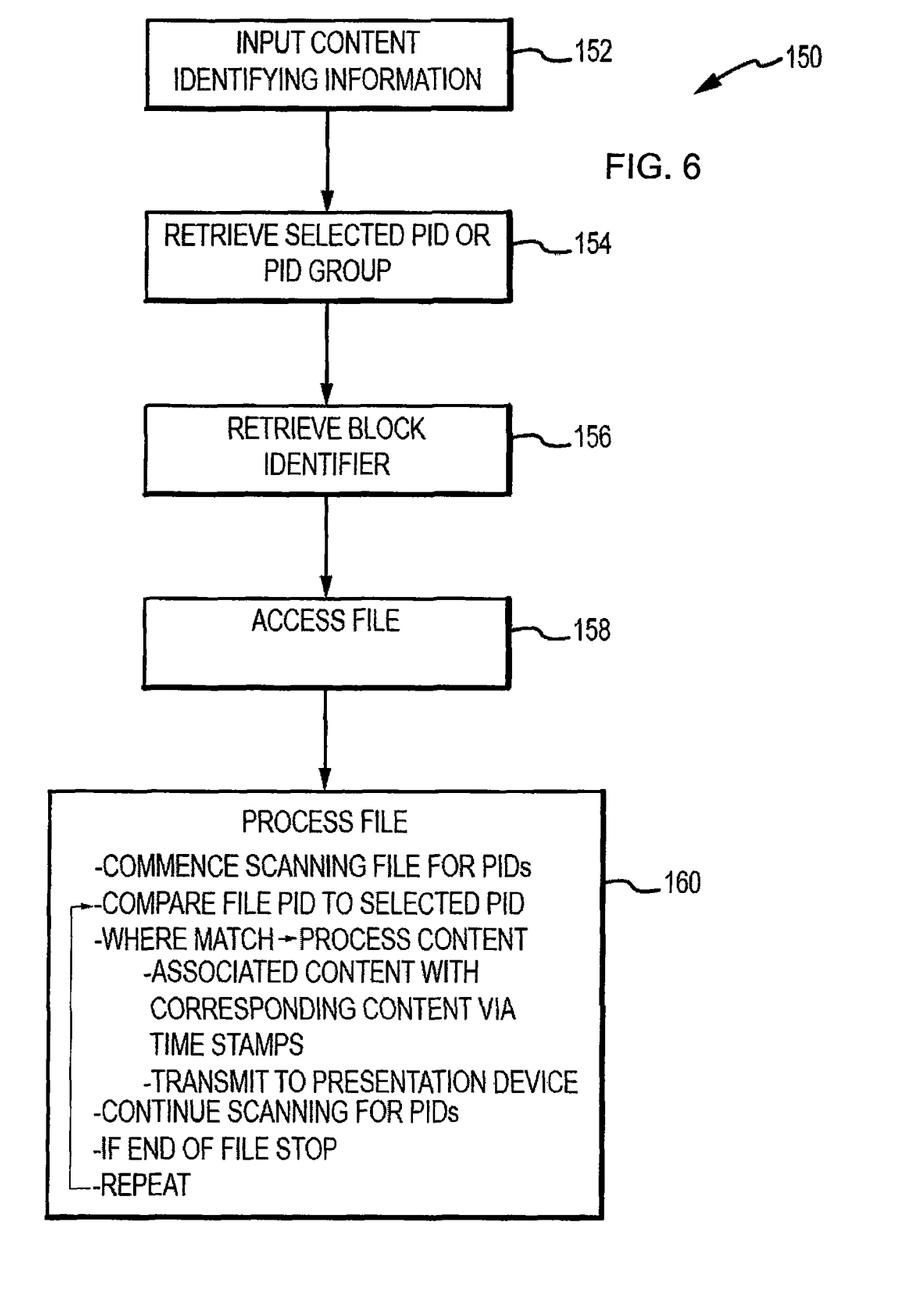
FIG. 6 is a flow chart depicting a method of processing multiplexed content.

Exemplary embodiments of the present disclosure can include one or more exemplary methods executed on exemplary systems for accessing and displaying the multiple instances of content (for example, exemplary system 120 can perform the exemplary method 150 shown in FIG. 6). In FIG. 6, a flow chart of the exemplary method 150 for accessing and displaying the multiple instances of content is shown. The method 150 can include receiving content identifying information 152 for the content and instructions for displaying the content. A content identifier or PID, or group of PIDs, can be determined at 154 from the content identifying information. A multiplexed block can be selected 156 based on the content identifiers being search for and the block can be accessed 158 and scanned 160 for the content identifiers. Where corresponding identifiers are found, the associated content can be processed.

Content identifying information can be received at 152 from a user. The content identifying information can be received when a user selects a television program from a menu. The menu can be arranged in one of several different ways, such as by channel and time, alphabetically by program name, or some other organizational pattern. In any of these cases, the selection of content by the user via a selection button on a remote control, or other selection mechanism, can provide the content identifying information.

The content identifier or group of content identifiers can be retrieved at 154 based on the content identifying information. That is, for example, the content identifier selection module 132 can be accessed by the processor 124 with the content identifying information. The content identifier selection module 132 can be used to look up the content identifiers associated therewith. For example, content identifying information including a channel, a date, and a time, can be used to access the content identifier selection module 132 and determine the PID or group of PIDs associated with the program.

In some embodiments, the content identifiers can be stored in the one or more selection menus available to a user. As such, selection of content by a user can automatically lead to the associated content identifiers and the step of accessing a content identifier selection module 132 may not be required. The system can also retrieve at 156 a block identifier. That is, while the system can have a content identifier or group of content identifiers, it may not have information regarding which block the content is stored in. Accordingly, the processor 124 can access the block selection module 130 and lookup or scan the module 130 to determine which block the content identifiers can be found in.

The processor 124 can then access 158 the block and begin scanning 160 the block of content for content identifiers associated with the selected content (i.e., selected content identifiers). As the block is scanned and content identifiers are encountered, the encountered content identifiers can be compared to the selected content identifiers. Where the encountered content identifiers do not match or correspond to the selected content identifiers, the processor 124 can scan for additional content identifiers. Where the encountered content identifiers do match or correspond to the selected content identifiers, the content in the block associated with the encountered content identifier can be processed. The processor can continue to scan the block for content identifiers and can continue to process content associated with encountered identifiers that match or correspond to the selected content identifiers. The processor 124 can continue this process until it reaches the end of the block.

Processing the content can include reading the content from the storage medium, synchronizing the content with related content, and transmitting the content to a presentation device. That is, the multiplexed nature of the multiple instances of content in the block can be such that several pieces of selected content are re-assembled prior to being provided to a presentation device. The synchronizing process can involve re-assembling the content based on content identifiers, but also based on time stamps, for example. In the context of television programming for example, a given instance of content can include audio, visual, and/or data components, for example. Each audio, visual, or data instance of content can include a time stamp for use in coordinating the portions and assuring that the program presents in a coordinated fashion. In addition, each group of audio, visual, and data, (i.e., once re-assembled based on time) can be re-assembled and sequenced with other groups of audio, visual, and data such that the stream of content for displaying a program is re-assembled. The processor can conduct these operations and transmit the content to a presentation device for viewing.

At least one advantage associated with the exemplary system and exemplary method described above is that more than one channel and thereby more than one program can be simultaneously displayed and/or recorded with a single tuner resource. The user can view and record up to N concurrently running programs, where N is the number of concurrent programs on a band multiplied by the number to tuners (e.g., the number of bands a receiver can concurrently receive).

In the present disclosure, the methods disclosed can be implemented as sets of instructions or software readable by a device. Further, it is understood that the specific order or hierarchy of operations in the methods disclosed are examples of sample approaches. In other embodiments, the specific order or hierarchy of operations in the method can be rearranged while remaining within the disclosed subject matter. The accompanying method claims present elements of the various operations in a sample order, and are not necessarily meant to be limited to the specific order or hierarchy presented.

The described disclosure can be provided as a computer program product, or software, that can include a non-transitory machine-readable medium having stored thereon instructions, which can be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium can take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on. Non-transitory storage medium is meant to include all storage mediums except transitory propagation signals.

It is believed that the present disclosure and many of its attendant advantages will be understood by the foregoing description, and it will be apparent that various changes can be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality can be separated or combined in blocks differently in various embodiments of the disclosure or described with different terminology. These and other variations, modifications, additions, and improvements can fall within the scope of the disclosure as defined in the claims that follow.

What is claimed is:

1. A method for recording multiple television channels of content, comprising:

receiving from a user, with an electronic processor, a request to record a first piece of content from a content delivery network, wherein the content delivery network delivers a plurality of pieces of content that are over a same period of time received from the content delivery network and that are organized into a plurality of content subsets on a plurality of television channels that are organized into a plurality of television channel subsets on a plurality of bands;

identifying a particular television channel associated with the first piece of content;

identifying a particular band associated with the particular television channel;

informing the user of other television channels associated with the particular band;

receiving from the user a request to record a second piece of content associated with one of the other television channels associated with the particular band, wherein
the particular television channel and the other television channels each being different television networks and are each encoded with a same control word; and concurrently recording the first piece of content and the second piece of content encoded with the same control word via a single tuner.

2. The method of claim 1, wherein the first piece of content and the second piece of content are delivered concurrently in a pre-scheduled temporally linear manner.

3. The method of claim 1, wherein informing the user of other television channels comprises:
informing the user of a plurality of pieces of content scheduled to be concurrently delivered on the other television channels associated with the particular band with the first piece of content on the particular television channel.

4. The method of claim 1, wherein the first piece of content and the second piece of content are streaming audio-video transmissions.

5. The method of claim 1, wherein concurrently recording comprises storing the first piece of content and the second piece of content to an electronic storage medium as separate decoded files.

6. A system for recording multiple content streams received via a single tuner, comprising:
a transponder-receiver configured to select and receive a band of television channels from a plurality of bands over a television channel distribution network; and
an electronic processor in communication with the transponder-receiver and in communication with an electronic storage medium, the electronic processor configured to:
receive user-input for recording a first piece of content, wherein
the transponder-receiver is configured to receive a plurality of pieces of content over a same period of time via the television channel distribution network and the plurality of pieces of content are received on a plurality of television channels of the band of television channels via the single tuner;
identify a particular television channel associated with the first piece of content;
provide the user information of other television channels associate with the particular band;
receive user-input that requests recording of the first piece of content;
identify a particular television channel associated with the first piece of content;
identify a particular band associated with the particular television channel;
provide the user with information of other television channels associated with the particular band of television channels;
receive from the user a request to record a second piece of content associated with one of the other channels associated with the particular band, wherein
the particular television channel and the other television channels each being different television networks and are each encoded with a same control word;
responsive to occurrence of a pre-scheduled content start time, tune the single tuner to the particular band; and
concurrently record the first piece of content and the second piece of content with the single tuner.

7. The system of claim 6, wherein the first piece of content and the second piece of content are delivered concurrently in a pre-scheduled temporally linear manner.

8. The system of claim 6, where being configured to inform the user of other television channels includes informing the user of a plurality of pieces of content scheduled to be delivered on the other television channels associated with the particular band concurrently with the first piece of content on the particular television channel.

9. The system of claim 6, wherein the first piece of content and the second piece of content are streaming audio-video transmissions.

10. The system of claim 6, wherein the electronic processor being configured to concurrently record comprises the electronic processor being configured to store the first piece of content and the second piece of content to the electronic storage medium as a single encoded file.

11. The system of claim 6, wherein the electronic processor being configured to concurrently record comprises the electronic processor being configured to:
store the first piece of content and the second piece of content to the electronic storage medium as separate decoded files.

12. A non-transitory computer-readable storage medium comprising instructions configured to be executed by a processor, the instructions which, when executed by the processor, cause the processor to:
receive from a user a request to record a particular piece of content from a content delivery network, wherein
the content delivery network delivers a plurality of pieces of content that are over a same period of time received from the content delivery network and that are organized into a plurality of content subsets on a plurality of television channels that are organized into a plurality of television channel subsets on a plurality of bands;
identify a particular television channel associated with the first piece of content;
identify a particular band associated with the particular television channel;
inform the user of other television channels associated with the particular band;
receive from the user a request to record a second piece of content associated with one of the other television channels associated with the particular band, wherein
the particular television channel and the other television channels each being different television networks and are each encoded with the same control word; and
concurrently record the first piece of content and the second piece of content encoded with the same control word via a single tuner.

13. The computer-readable storage medium of claim 12, wherein the first piece of content and the second piece of content are delivered concurrently in a pre-scheduled temporally linear manner.

14. The computer-readable storage medium of claim 12, wherein the instructions, which when executed by the processor, cause the processor to inform the user of other television channels, further comprises instructions configured to be executed by the processor that when executed by the processor causes the processor to:

inform the user of a plurality of particular pieces of content scheduled to be delivered on the other television channels associated with the particular band concurrently with the first piece of content on the particular television channel.

15. The computer-readable storage medium of claim 12, wherein the first piece of content and the second piece of content are streaming audio-video transmissions.

16. The computer-readable storage medium of claim 12, wherein the instructions, which when executed, cause the processor to concurrently record the first piece of content and the second piece of content encoded with the same control word via the single tuner comprises additional instructions, which when executed, cause the processor to:

store the first piece of content and the second piece of content to another electronic storage medium as a single encoded file.

17. The computer-readable storage medium of claim 12, wherein the instructions, which when executed, cause the processor to concurrently record the first piece of content and the second piece of content encoded with the same control word via the single tuner comprises additional instructions, which when executed, cause the processor to:

store the first piece of content and the second piece of content to another electronic storage medium as separate decoded files.

\* \* \* \* \*